(12) United States Patent
Katsuki

(10) Patent No.: US 8,171,505 B2
(45) Date of Patent: May 1, 2012

(54) DISC DRIVE DEVICE

(75) Inventor: Masanobu Katsuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 48 days.

(21) Appl. No.: 12/864,842

(22) PCT Filed: May 27, 2008

(86) PCT No.: PCT/JP2008/059748
§ 371 (c)(1),
(2), (4) Date: Jul. 27, 2010

(87) PCT Pub. No.: WO2009/096051
PCT Pub. Date: Aug. 6, 2009

(65) Prior Publication Data
US 2010/0313211 A1     Dec. 9, 2010

(30) Foreign Application Priority Data
Jan. 28, 2008   (JP) ................................. 2008-016477

(51) Int. Cl.
*G11B 17/04*     (2006.01)
(52) U.S. Cl. ........................................ 720/620
(58) Field of Classification Search .................. None
See application file for complete search history.

(56) References Cited

U.S. PATENT DOCUMENTS

| | | | | |
|---|---|---|---|---|
| 5,195,079 A | * | 3/1993 | Inoue et al. | ................... 720/635 |
| 6,167,015 A | | 12/2000 | Jeong | |
| 2003/0174627 A1 | | 9/2003 | Suzuki | |
| 2005/0223399 A1 | | 10/2005 | Suzuki | |
| 2006/0143631 A1 | | 6/2006 | Watanabe | |
| 2007/0277187 A1 | * | 11/2007 | Fujisawa | ....................... 720/623 |

FOREIGN PATENT DOCUMENTS

| | | |
|---|---|---|
| EP | 1 376 568 A1 | 1/2004 |
| JP | 4-364264 A | 12/1992 |
| JP | 7-29278 A | 1/1995 |
| JP | 11-259944 A | 9/1999 |
| JP | 2002-150650 A | 5/2002 |
| JP | 2002-304798 A | 10/2002 |
| JP | 2004-46913 A | 2/2004 |
| JP | 2006-185565 A | 7/2006 |
| JP | 2006-302384 | 11/2006 |

* cited by examiner

*Primary Examiner* — Allen Cao
(74) *Attorney, Agent, or Firm* — Birch, Stewart, Kolasch & Birch, LLP

(57) ABSTRACT

To provide a disc drive device which does not spend a lot of money on components and requires the less number of components than the conventional technology and has a function to correctly dispose an inserted disc by a slot-in method at a place where the disc can be driven according to the size of the disc. The disc drive device comprises an abutment pad which receives the inserted disc in a different posture depending on the size of the disc, a coupling member which rotationally transfers by a different distance at a different position according to the posture of the abutment pad when it rotationally transfers along with the bring-in operation of the disc, and a spring which applies a predetermined energizing force to the coupling member. Due to the coupled operation of these components, etc., the inserted disc can be correctly disposed at a predetermined place where the disc can be driven according to the size of the disc.

11 Claims, 15 Drawing Sheets

DISC DRIVE DEVICE

FIELD OF THE INVENTION

The present invention relates to a disc drive device having a slot-in loading mechanism

BACKGROUND ART

A disc drive device records data on a disc such as CD or DVD, and reads data from a disc utilizing a disc drive built in the device. An example of inserting the disc into the device includes the slot-in system. In the slot-in system, when the disc is inserted in a slot (disc insertion slot) provided on the side surface etc. of the disc drive device and gently pressed, the disc is automatically transferred into the device by rollers equipped in the device. In this system, two types of discs having different diameters, 8 cm and 12 cm, are inserted into the same disc insertion slot by the same process. For reading out of the data by the disc drive, it is required to precisely place the disc on a predetermined position in the device. Therefore, in the case of the slot-in system, it is essential to precisely place the inserted disc on the predetermined position, where the disc can be driven, in response to its size.

The above function is implemented by providing the device with a sensor for determining size of the inserted disc, thereby placing the inserted disc on the predetermined position in response to the determination result. However, in this case, production cost increases due to the use of the sensor. Here, Japanese Unexamined Patent Application Publication No. 2006-302384 discloses the invention to reduce the production cost and to implement the above function. In Japanese Unexamined Patent Application Publication No. 2006-302384, the invention includes a disc stopper receiving an inserted disc and controlling a distance of movement in a direction of insertion, a select arm contacting the disc in different positions depending on a size of the inserted disc, a spring biasing the select arm at a predetermined degree, a stopper arm connecting the disc stopper and the select arm, and a spring biasing the select arm at a predetermined degree. By linkage of the above components, the inserted disc is precisely placed on a predetermined position. However, in Japanese Unexamined Patent Application Publication No. 2006-302384, the above function is implemented mainly by two springs and three other components, and causes the need for many components. Therefore, this is inconvenient in terms of space-saving in the disc drive device, and for minimizing the size of the device.

Patent Reference 1: Japanese Unexamined Patent Application Publication No. 2006-302384

DISCLOSURE OF THE INVENTION

Problems that the Invention Tries to Solve

The present invention provides a disc drive device that can reduce the production cost, and has a function of precisely placing the inserted disc on the predetermined position, where the disc can be driven, according to its size by the slot-in system with a smaller number of components compared with the conventional technology.

Means for Solving the Problems

In order to solve the above problem, the following invention is provided.

We provide mainly a disk drive device comprising a contacting pad, receiving the disc in a different position depending on the size of the inserted disc, a connecting member, rotationally moving in a different trajectory and in a different location in response to the position of the contacting pad when rotationally moving upon the retraction of the disc, and a spring, biasing the connecting member to a predetermined degree.

Specifically, the following invention is provided.

A first aspect of the invention is a disc drive device capable of distinguishing discs of different diameters, and of loading the discs onto respective proper positions using a slot-in system, comprising a first driving unit for retraction, retracting the discs of each respective diameter in an inward direction of the device, a contacting pad, contacting with an edge of the disc retracted by the driving unit for retraction at different points depending on the disc diameter, and sliding in response to the retraction of the disc in a sliding position depending on a contacting point, a shifter, sliding in a direction of retracting the disc, and a connecting member, sliding in response to variations of the sliding position of the contacting pad, and rotationally moving in response to the sliding of the contacting pad, wherein the connecting member comprises a latching protrusion/a protrusion with a latch function, rotationally moving in a different trajectory in response to the sliding position of the contacting pad, the shifter comprises a guiding groove for latching protrusion, into which the latching protrusion is inserted, and when the latching protrusion is inserted into the guiding groove for latching protrusion, the rotational movement of the connecting member in response to the sliding of the contacting pad stops, and the disc is placed such that the discs of respective diameters are set at a predetermined position at the center of a turntable.

A second aspect of the invention is the disc drive device based on the first aspect, wherein the connecting member also rotationally moves in response to the sliding of the shifter in the direction of retracting the disc, and the contacting pad also slides in response to the rotational movement of the connecting member in response to the sliding of the shifter in the direction of retracting the disc, thereby being non-contact with the disc.

A third aspect of the invention is the disc drive device based on the first or second aspect, further comprising a biasing spring, biasing the sliding connecting member to return to an initial position.

A fourth aspect of the invention is the disc drive device based on any one of the first to third aspects, comprising a guiding member, including a plurality of sliding grooves to slide the contacting pad in response to the retraction of the disc, wherein the contacting pad further comprises a plurality of sliding protrusions inserted into the sliding grooves, and timings of starting movements between the plurality of sliding protrusions are determined in response to the contacting points of the contacting pad with the disc, and the sliding position of the sliding contacting pad is determined in response to the timings of starting movements between the plurality of sliding protrusions.

A fifth aspect of the invention is the disc drive device based on any one of the first to fourth aspects, wherein the connecting member comprises a protrusion for ejecting shifter, rotationally moving in different trajectory in response to the sliding position of the contacting pad, and the shifter comprises two portions for ejection, respectively contacting with the protrusion for ejecting shifter, rotationally moving in a different trajectory.

EFFECTS OF THE INVENTION

According to the disc drive device of the present invention, it is possible to precisely place the inserted disc on the predetermined position, where the disc can be driven, in response to its size by the slot-in system whilst reduced production cost and with smaller number of components compared to the conventional technology. As a result, it is possible to keep prices down and to save space in the device, thereby downsizing the production.

DETAILED DESCRIPTION OF THE INVENTION

Hereinbelow, embodiments of the present invention will be described with reference to drawings. The present invention is not to be limited to the above embodiments and able to be embodied in various forms without departing from the scope thereof.

<<First Embodiment>>
<Concept of First Embodiment>

In the disc drive device of this embodiment, the 'contacting pad', which receives the inserted disc, and slides in a direction of insertion, thereby controlling a movement distance of the disc, slides in a different position in response to a diameter of the disc. The other components operate differently in response to the sliding position of the contacting pad, and by a linkage of the operations, the 12 cm in diameter and 8 cm in diameter discs are precisely placed at a predetermined position, respectively.

<Functional Configuration of First Embodiment>

The disc drive device of the embodiment comprises a 'first driving unit for retraction' (1401), a 'contacting pad' (1402), a 'connecting member' (1403), and a 'shifter' (1415). Moreover, a 'biasing spring' (1404), a 'guiding member' (1406), and a 'gear' (1418) may be comprised. Note that functions of the 'biasing spring' (1404), the 'guiding member' (1406), and the 'gear' (1418) may be implemented by other members.

Hereinbelow, a functional configuration thereof is described.

<<Retraction of Disc by First Driving Unit for Retraction>>

The 'first driving unit for retraction' (1401) is configured to retract the disc of each diameter in an inward direction of the device.

The 'disc of each diameter' corresponds to '12 cm diameter disc' and '8 cm diameter disc', which are generally used. FIG. 1(*a*) shows insertion of the 12 cm diameter disc (0108) in an inward direction of the device (rightward in the diagram). For convenience, FIG. 1(*a*) shows the disc drive device of this embodiment excluding the shifter, which is essential for the disc drive device. FIG. 1(*b*) shows a bottom view of FIG. 1(*a*). The first driving unit for retraction includes two rollers (0101) separately provided at upper and lower portions in the diagram, and a motor (not indicated) for driving the rollers to move rotationally. The two rollers (0101) can rotate around the rotational axis for roller (0109), and can vertically sandwich the inserted disc (0108). By vertically sandwiching the disc, a vertical position of the inserted disc is precisely determined at a predetermined position. Moreover, when inserting the 8 cm diameter disc, as shown in FIG. 2, the two rollers (0201) rotate around the rotational axis for roller (0209), and vertically sandwich the inserted disc (0208), thereby determining a vertical position of the disc (0208) at a predetermined position. After that, the rollers (0101, 0201) sandwiching the disc rotationally move in a predetermined direction by the motor etc. (not indicated), thereby retracting the disc (0108, 0208) in an inward direction of the device (rightward in the diagram). Moreover, when ejecting the disc from the device, the roller of the first driving unit for retraction (0101) rotates in the opposite direction to the above, thereby retracting the disc outward the device (leftward in the diagram).

<<Contacting Pad>>

The 'contacting pad' (0102, 0202) is configured to contact with an edge of the disc retracted by the driving unit for retraction at different points depending on the disc diameter, and sliding in response to the retraction of the disc in a sliding position depending on a contacting point.

FIG. 3(*a*) shows the contacting pad (0102, 0202) in a state of FIGS. 1(*a*) and 2. FIG. 3(*c*) shows a side view of the contacting pad (0302). Portions (i) to (iv) in FIGS. 3(*a*) and (*c*) contact with the edge of the disc. Hereinbelow, with reference to these diagrams, the respective descriptions of the 'contacting points' of the contacting pad with the edge of the disc, and the 'sliding positions' of the contacting pad in response to the contacting points when inserting the 12 cm and 8 cm diameter discs are provided. Note that, the position of the contacting pad (0102, 0202) of FIGS. 1(*a*) and 2 is regarded as a 'basic position' and variation therefrom is described.

<<Contacting Point and Sliding Position when Inserting 12 cm Diameter Disc>>

When inserting the 12 cm diameter disc, as shown in FIG. 1(*a*), at the outset, the disc (0108) contacts with the contacting pad in the basic position (0102) only at the contacting point (i). After that, the disc (0108) continues to move rightward in the diagram due to the rotational movement of the first driving unit for retraction (0101). Due to the movement, the contacting pad (0102) rotationally moves around the rotational axis for contacting pad (0110) in a direction of dashed arrow (I) (anticlockwise in the diagram). As a result, as shown in FIG. 4, the disc (0408) contacts with three contacting points (i), (iii), and (iv) of the contacting pad (0402). A position of the contacting pad (0402) at this time is the 'sliding position when inserting 12 cm diameter disc'. Therefore, the contacting pad (0402) slides rightward in the diagram maintaining the sliding position in response to the subsequent movement of the disc upon retraction (rightward in the diagram). Note that, the three contacting points (i), (iii), and (iv) of the contacting pad contact with the 12 cm diameter disc so as to vertically sandwich the disc (0108). As a result, the vertical position of the disc (0108) is precisely determined at a predetermined position.

Here, for example, the above rotational movement of the contacting pad (0102) is implemented as follows. The contacting pad may have a plurality of sliding protrusions as shown by (v) to (viii) in FIGS. 3(*b*) and (*c*). FIG. 3(*b*) shows a bottom view of the contacting pad. Moreover, as shown by (v) to (viii) in FIG. 5(*a*), the guiding member (0106) may have a plurality of sliding grooves to slide the contacting pad in response to the retraction of the disc. FIG. 5(*b*) shows a bottom view of the guiding member of FIG. 5(*a*).

The plurality of sliding protrusions (v) to (viii) of the contacting pad are respectively inserted into the plurality of sliding grooves of the same reference codes (v) to (viii) of the 'guiding member' of FIG. 5(*a*) in a direction indicated in FIG. 3(*a*). Note that, the plurality of sliding protrusions (v) to (viii) of the contacting pad are inserted into the plurality of sliding grooves of the same reference codes (v) to (viii) respectively. Here, as shown in FIG. 3(*b*), the sliding protrusions (vi) and (vii) are protrusions, which have major axes shorter than the widths of the sliding grooves, to which the protrusions are inserted. Meanwhile, the sliding protrusions (v) and (viii) are protrusions, which have head portions with major axes longer than the widths of the sliding grooves on the top of the bodies with major axes equal to or shorter than the widths of the sliding grooves. Due to two head portions, as shown in FIG. 1(a), the contacting pad (0102), whose sliding protrusions are inserted into the plurality of sliding grooves of the guiding member (0106), is not detached. Therefore, in FIG. 1(a), the plurality of sliding protrusions of the contacting pad can move only within the range determined by the respective sliding grooves. Note that, the sliding protrusion (v) has a major axis shorter than the width of the sliding groove, to which the protrusion is inserted, and the sliding protrusion (viii) has a major axis nearly equal to the width of the sliding groove, to which the protrusion is inserted. The center of this sliding protrusion (viii) is the rotational axis (0110) for the contacting pad (0102).

FIG. 6 shows movement of the sliding protrusion when the contacting pad (0102, 0402) rotationally moves from the position of FIG. 1(a) to the position of FIG. 4. In FIG. 6, the respective sliding protrusions of the contacting pad, located in the sliding grooves (v) to (viii) are indicated by small circles. White circles indicate sliding protrusions in a state of FIG. 1(a), and black circles indicate sliding protrusions in a state of FIG. 4. The sliding protrusion located in the sliding groove (viii) is not indicated by the black circle, and this means that this protrusion does not rotationally move. Meanwhile, the sliding protrusions located in the sliding grooves (v) to (vii) rotationally move at the same rotational angle around the rotational axis (0110) of the sliding protrusion in the sliding groove (viii). Therefore, the width and the major axis of the respective grooves are designed to enable the rotational movement as shown in the diagram. Thus, the rotational movement of the contacting pad is implemented. Moreover, when the contacting pad rotationally moves, as shown in FIG. 4, the contacting points (i), (iii), and (iv) contact with the disc (0408). Moreover, the contacting point (iii) or (iv) may have appropriate clearance between the disc, and the two points (i) and (iii), or (i) and (iv) may contact with the disc.

When setting the contacting pad (0102) to the guiding member (0106), the sliding protrusions (v) and (viii) can be inserted from wide portions located at the right edge of the sliding grooves (v) and (viii) (refer to FIG. 5(a)). Therefore, widths of the wide portions located at the right edge of the sliding grooves (v) and (viii) are designed to be longer than those of the major axes of the head portions of the sliding protrusions (v) and (viii).

<<Contacting Point and Sliding Position when Inserting 8 cm Diameter Disc>>

When inserting the 8 cm diameter disc, as shown in FIG. 2, at the outset, the disc (0208) contacts with the contacting pad in the basic position (0202) at the contacting points (ii) and (iii). Note that, in FIG. 2, the contacting point (i) appears to contact with the disc (0208). However, the contacting point of the contacting pad (0202) is actually the shaded portion of FIG. 3(c), and in FIG. 2, the contacting point (i) have appropriate clearance between the disc, and does not come into contact with the disc.

After contacting the contacting pad (0202) at two contacting points (ii) and (iii), the disc (0208) continues to move rightward in the diagram due to the rotational movement of the first driving unit for retraction (0201). At this time, the contacting pad (0202) moves rightward in the diagram contacting with the disc at the two contacting points (ii) and (iii) without changing the basic position. A position (basic position) of the contacting pad (0202) at this time is the 'sliding position when inserting 8 cm diameter disc'. Note that, the two contacting points (ii) and (iii) of the contacting pad contact with the 8 cm diameter disc so as to vertically sandwich the disc (0208). As a result, the vertical position of the disc (0208) is precisely determined at a predetermined position.

<<Sliding of Contacting Pad in Response to Retraction of Disc>>

As described above, the contacting pad (0202, 0402) takes the sliding position (i.e. the 'sliding position when inserting 12 cm diameter disc' in FIG. 2, or the 'sliding position when inserting 8 cm diameter disc' in FIG. 4) in response to diameter of the inserted disc.

After that, the contacting pad, maintaining the sliding position, slides in a direction of retracting the disc inward of the device (rightward in the diagram) in response to subsequent retraction of the disc.

In order to implement the above functions, for example, a guiding member (0106, 0206), including a plurality of sliding grooves to slide the contacting pad in response to the retraction of the disc, may be provided, and the contacting pad (0202, 0402) may include a plurality of sliding protrusions inserted into the sliding grooves. Moreover, in this case, as shown in FIG. 6, the sliding groove (vi) of the guiding member (0606) may have a groove portion (0611), which is designed to be wide for enabling the rotational movement, and a groove portion (0612), which is designed to be biforked and to have width nearly equal to a major axis of the sliding protrusion. The sliding protrusion located in the sliding groove (vi) slides in one of the biforked grooves in response to the sliding position of the contacting pad. Specifically, when inserting the 12 cm diameter disc, at the outset, the sliding protrusion rotationally moves from the white circle to the black circle, and slides in the upper sliding groove in the diagram. Meanwhile, when inserting the 8 cm diameter disc, in the diagram, the protrusion moves from the white circle to the lower sliding groove, and slides therein. Here, as described above, the biforked sliding groove is designed to have a width nearly equal to a major axis of the sliding protrusion. Therefore, when the sliding protrusion is located in the groove, in the diagram, vertical movement of the sliding protrusion is restricted, and only horizontal movement is possible.

<<Timings of Starting Movements Between Plurality of Sliding Protrusions, and Sliding Position of Contacting Pad Determined in Response to Timings>>

Here, the timings of starting movements between the plurality of sliding protrusions (FIG. 3(b)) may be determined in response to the contacting points of the contacting pad with the disc. Moreover, the sliding position of the sliding contacting pad may be determined in response to the timings of starting movements between the plurality of sliding protrusions. Hereinbelow, this is concretely described.

As shown in FIG. 1(a), when inserting the 12 cm diameter disc, at the outset, the contacting pad (0102) contacts the disc (0108) only at the contacting point (i). Due to the force only on the contacting point (i) (rightward in the diagram), and due to press of the protrusion (vii) near the sliding protrusion (viii) leftward in the diagram by the after-mentioned biasing spring (0104), the sliding protrusions (v), (vi) and (vii) of the contacting pad (0102) start rotational movement (anticlockwise in the diagram) around the sliding protrusion (viii) (FIG. 6). Subsequently, when the disc (0108) moves rightward in the diagram the disc contacts the sliding protrusions (iii) and (iv), so that the contacting pad (0402) stops the rotational movement. As a result, as shown in FIG. 4, the contacting pad (0402) takes the 'sliding position when inserting 12 cm diameter disc'. In this case, the contacting points of the contacting pad (0402) with the disc (0408) are (i), (iii), and (iv). After that, the retraction of the disc causes the force rightward in the diagram on the contacting points (i), (iii), and (iv), so that the sliding protrusions (v), (vi), (vii) and (viii) of the contacting pad (0402) (FIG. 6) start sliding (rightward in the diagram). Therefore, the contacting pad (0402) slides in the 'sliding position when inserting 12 cm diameter disc'.

Meanwhile, as shown in FIG. 2, when inserting 8 cm diameter disc, at the outset, the contacting pad (0202) contacts the disc (0208) at the contacting points (ii) and (iii). Since the disc (0208) contacts at the contacting points (ii) and (iii) at the same time, due to the force on the contacting points (ii) and (iii) (rightward in the diagram), the sliding protrusions (v), (vi), (vii) and (viii) of the contacting pad (0202) start sliding rightward in the diagram at the same time. Therefore, the contacting pad (0202) slides in the 'sliding position when inserting 8 cm diameter disc'.

<<Connecting Member and Biasing Spring>>

A 'connecting member' (0103) is configured to slide in response to variation of the sliding position (rotational movement), and a 'biasing spring' (0104) is configured to bias the sliding connecting member to return to an initial position.

FIG. 7(*a*) shows the connecting member in a state of FIG. 1(*a*) or FIG. 2 (0103, 0203). FIG. 7(*b*) shows a bottom view of the connecting member of FIG. 7(*a*). As shown in FIGS. 7(*a*) and 7(*b*), the connecting member (0703) includes the guiding protrusions (0705(A) and 0705(B)), latching protrusions (0707(*xi*) and 0707(*xii*)), and protrusions for ejecting shifter (0714) on both sides. Additionally, the sliding grooves (vii) and (x) are also included.

<<Positional Relation Among Connecting Member, Contacting Pad and Guiding Member>>

Here, with reference to FIG. 1(*a*), positional relation among the contacting pad (0102), the connecting member (0103) and guiding member (0106) is described. The diagram shows the guiding member (0106), the connecting member (0103), and the contacting pad (0102) in order from back to front. The protrusion (x) (FIG. 6) of the guiding member (0106) is inserted into the sliding groove (x) (FIG. 7(*a*)) of the connecting member (0103). The guiding protrusion (0705 (B)) of the connecting member is inserted into the sliding groove (ix) (FIG. 6) of the guiding member. The sliding protrusion (vii) (FIG. 3(*b*)) of the contacting pad (0102) is inserted into the sliding groove (vii) (FIG. 7(*a*)) of the connecting member (0103) and into the sliding groove (vii) of the guiding member (0106). As described above, the sliding protrusions (v), (vi) and (viii) (FIG. 3(*b*)) of the contacting pad (0102) are inserted into the sliding grooves (v), (vi) and (viii) of the guiding member (0106) respectively. Note that, in a state of FIG. 1(*a*), the guiding protrusion (0105(A), 0705(A)) of the connecting member (0103) contact with the side surface (0302(A) in FIG. 3) of the contacting pad (0102).

<<Slide of Connecting Member in Response to Variation of Sliding Position (Rotational Movement) of Contacting Pad>>

Here, the 'slide of connecting member in response to variation of sliding position (rotational movement) of contacting pad (0102)' of the 'connecting member' (0103) is described.

When the contacting pad (0102) rotationally moves around the rotational axis for contacting pad (0110) in the direction of dashed arrow (I) (anticlockwise in the diagram), from the state of FIG. 1(*a*) as described above, the contacting pad (0102) applies a force upward on the connecting member (0103) through the guiding protrusion (0105(A)). Then, the connecting member (0103) guided by the sliding grooves (vii) and (x) (FIG. 7(*a*)) slides in a direction of dashed arrow (II) in FIG. 1(*a*). As a result, the connecting member is in the state of FIG. 4. Here, FIG. 8 shows movement of the guiding protrusion (0705(B)) when the connecting member (0103, 0403) slides from the position of FIG. 1(*a*) to FIG. 4. In FIG. 8, the guiding protrusion located in the sliding grooves (ix) (0805(B)) is indicated by small circles. White circle indicates the guiding protrusion in a state of FIG. 1(*a*), and black circle indicates the guiding protrusion in a state of FIG. 4. Thus, the guiding protrusion (0705(B)) slides in the sliding groove (ix) upon the slide of the connecting member (0103). Note that, the connecting member (0103) and the guiding protrusions (0105(A), (B)) of the connecting member slide upon the rotational movement of the contacting pad (0102), and the contacting pad (0102) rotationally moves only when inserting the 12 cm diameter disc. Therefore, the connecting member (0103) and the guiding protrusions (0105(A), (B)) of the connecting member slide only when inserting the 12 cm diameter disc.

<<Relation Between Connecting Member and Biasing Spring>>

Subsequently, the configuration, in which the 'biasing spring' (0104) biases the sliding connecting member (0103) to return to the initial position, is described. As shown in FIG. 1(*a*), one edge of the biasing spring (0104) is fixed to the guiding member (0106) and another edge thereof is fixed to the connecting member (0103). Therefore, when the connecting member (0103) in the state of FIG. 1(*a*) slides upward in the diagram, and comes to be in the state of FIG. 4, the biasing spring (0404) is pulled upper-leftward in the diagram and developed. Here, the biasing spring (0404) has a force to return from the state of FIG. 4 to the original state of FIG. 1(*a*), so that the portion fixed to the connecting member (0403) is pulled lower-rightward in the diagram. This biasing force (lower-rightward in FIG. 4) is dispersed in the directions guided by the sliding grooves (vii) and (x) of the connecting member. As a result, the sliding connecting member (0103, 0403) is biased to return to the initial position. Moreover, the biasing spring (0104) is fixed to the right-hand side of the sliding groove (x) of the connecting member (0103), so that the connecting member (0103) is biased clockwise in FIG. 1(*a*) around the protrusion (x) of the guiding member (0106). Moreover, the connecting member (0103) is biased clockwise, so that the contacting pad (0102) is also biased leftward in FIG. 1(*a*) through the sliding groove (vii) and the sliding protrusion (vii) of the contacting pad (0102). In this case, the biasing spring (0104) appropriately biases the connecting member (0103) in the state of FIG. 1(*a*). Note that, the biasing force of the biasing spring is smaller than the retracting force of the first driving unit for retraction (0401). Therefore, as shown in FIG. 4, when the disc (0408) moves rightward by the force of the first driving unit for retraction (0401) (when retracting the disc), the connecting member (0403) maintains the state of FIG. 4 against the biasing force of the biasing spring (0404). Meanwhile, when the disc (0408) moves leftward in the diagram (when ejecting the disc), the connecting member (0403) returns from the position after sliding (0403) to the original position (0103) due to the biasing force of the biasing spring (0404). In this case, upon the slide of the connecting member (0103, 0403) due to the biasing force of the biasing spring, the contacting pad (0102, 0402) also rotationally moves (clockwise in the diagram), and returns from the 'sliding position when inserting 12 cm diameter disc' to the basic position.

<<Rotational Movement of Connecting Member in Response to Slide of Contacting Pad>>

The 'connecting member' (0203, 0403) is configured to rotationally move in response to the sliding of the contacting pad (0202, 0402). Moreover, the 'guiding protrusion' (0705 (B) in FIG. 7) of the connecting member (0203) rotationally moves in different trajectory in response to the sliding position of the contacting pad (0202, 0402). Moreover, the 'connecting member' (0206, 0406) may have a sliding groove to make the guiding protrusion (0705(B)) rotationally move in different trajectory. Hereinbelow, description is provided with reference to diagrams.

When the contacting pad (0202, 0402) slides rightward in the diagram in the sliding position of FIG. 2 or 4, the connecting member (0203, 0403) is biased rightward due to the sliding protrusion (vii) (FIG. 3(b)) of the contacting pad (0202, 0402) inserted into the sliding groove (vii) (FIG. 7(a)). As a result, the connecting member rotationally moves anticlockwise in the diagram around the protrusion (x) (FIG. 6) of the guiding member (0206, 0406) as a rotational axis, inserted into the sliding groove (x) (FIG. 7(a)). Here, the connecting member slides in response to the variation of the sliding position (rotational movement) of the contacting pad. As a result, the guiding protrusion of the connecting member (0203, 0403) inserted into the sliding groove (ix) (FIG. 8) of the guiding member (0206, 0406) rotationally moves in one of the biforked sliding grooves (ix). Specifically, when inserting 12 cm diameter disc, the protrusion rotationally moves in the long sliding groove, which is located in the upper part of the diagram, and when inserting 8 cm diameter disc, the protrusion rotationally moves in the short sliding groove, which is located in the lower part of the diagram.

Here, with reference to FIG. 6, a relation between the sliding grooves (v) to (viii) and the sliding groove (ix) is described. When inserting the disc into the device, the contacting pad is guided by the sliding grooves (v) to (viii) (FIG. 6) of the guiding member (0606), thereby sliding (rightward in the diagram). Moreover, the connecting member is guided by the sliding groove (ix) (FIG. 6), thereby rotationally moving (anticlockwise in the diagram) simultaneously with the slide of the contacting pad. The slide of the contacting pad and the rotational movement of the connecting member are configured such that if any one of them stops, the others also stop.

<<Shifter>>

The 'shifter' has a function of sliding in a direction of retracting the disc, and slides toward the retraction position of the disc. Therefore, the disc is inserted to the predetermined position in the device, and the shifter transfers a driving unit to a predetermined position in the device, thereby reading the disc data.

<<Slide of Shifter>>

FIG. 12 shows a bottom view of the 'shifter' (1415) in a state of FIG. 14. As shown in FIG. 12, the shifter includes a portion for ejection of the 8 cm diameter disc (1216) and a portion for ejection of the 12 cm diameter disc (1217). The portion for ejection (1216, 1217) contacts with a protrusion for ejecting shifter (0214, 0414) of the connecting member (0203, 0403) rotationally moving in a different trajectory in response to the sliding position of the contacting pad (0202, 0402), in the rotational trajectory. When portions for ejection of the shifter (1216, 1217) contact with the protrusion for ejecting shifter (0214, 0414) of the connecting member (0203, 0403), the shifter (1415) is pushed leftward in FIG. 14, thereby engaging with a gear (1418). After that, the gear driven by a motor (not indicated) rotates in a predetermined direction, so that the shifter (1415) slides toward the position, to which the disc is retracted (the retraction position of the disc).

<<Stoppage of 'Rotational Movement of Connecting Member in Response to Sliding Position of Contacting Pad'>>

Moreover, as shown in FIG. 12, the shifter may include two guiding grooves for latching protrusion (1220(xi), 1220(xii)) in the lower-left portion in the diagram. One of the latching protrusions (0707(xi), 0707(xii) in FIG. 7) of the connecting member rotationally moving in a different trajectory in response to the sliding position of the contacting pad is inserted into one of the guiding grooves for latching protrusion (1220(xi), 1220(xii)). Hereinbelow, this is concretely described with reference to FIGS. 11 and 13(A), 13(B)

FIG. 11 is a diagram showing operations in the disc drive device when inserting the 8 cm diameter disc. FIGS. 11(b), (c), and (d) are perspective diagrams of the disc drive device, and the operations executed in the order of (b), (c), and (d).

When the connecting member (1103) in the state in FIG. 11(b) rotationally moves in response to the slide of the contacting pad (1102), and comes to be in the state of FIG. 11(c), the protrusion for ejecting shifter (1114) of the connecting member (1103) contacts with the portion for ejection of shifter (1116) of the shifter (1115), so that the shifter (1115) starts sliding leftward in the diagram as described above. Then, the latching protrusion (0707(xi)) of the connecting member (1103) is inserted into the guiding grooves for latching protrusion (1220(xi)) of the shifter (1115)

Here, when the latching protrusion (0707(xi)) of the connecting member (1103) is inserted into the guiding grooves for latching protrusion (1220(xi)) of the shifter (1115), the rotational movement anticlockwise in the diagram of the latching protrusion (0707(xi)) is restricted, thereby stopping the rotational movement anticlockwise in the diagram of the connecting member (1103). Therefore, at this time, the rotational movement of the connecting member (1103) in response to the slide of the contacting pad (1102) stops.

The case of inserting the 8 cm diameter disc is described above, and the case of inserting the 12 cm diameter disc is similarly processed.

FIGS. 13(A) and 13(B) are diagrams showing operations in the disc drive device when inserting the 12 cm diameter disc. FIGS. 13(b), (c), (d) and (e) are perspective diagrams of the disc drive device, and the operations executed in the order of (b), (c), (d) and (e).

Similarly, when inserting the 12 cm diameter disc as shown in FIG. 13(B), the protrusion for ejecting shifter (1314) of the connecting member (1303) contacts the portion for ejection of shifter (1317) of the shifter (1315), so that the shifter (1315) starts sliding leftward in the diagram as described above. Then, the latching protrusion (1307(xi)) of the connecting member (1303) is inserted into the guiding grooves for latching protrusion (1320(xi)) of the shifter (1315). As a result, the rotational movement anticlockwise in the diagram of the latching protrusion (1307(xi)) is restricted, thereby stopping the rotational movement anticlockwise in the diagram of the connecting member (1303). Therefore, at this time, the rotational movement of the connecting member (1303) in response to the slide of the contacting pad (1302) stops.

<<Stoppage of Slide of Contacting Pad in Response to Retraction of Disc>>

Here, the slide of the contacting pad and the rotational movement of the connecting member are configured such that if any one of them stops, the others also stop. Therefore, due to the rotational movement of the connecting member in response to the respective disc diameter, the slide of the contacting pad in response to the retraction of the disc stops.

At this time, each disc of different diameter is placed such that the disc is located at a predetermined relative position to the center of a turntable (FIGS. 9 and 10).

<<Separation Between Disc and Contacting Point of Contacting Pad>>

It is necessary to rotate the disc for writing or reading data. Therefore, it is necessary to separate the contacting pad from the disc placed such that the disc is located at the predetermined relative position to the center of the turntable. Hereinbelow, this is described with reference to FIG. 11. In order to implement the following configuration, the shifter may include grooves (1220(xii), 1220(xiv)) at the edge portion of the guiding grooves for latching protrusion (1220(xi), 1220(xii)) for varying trajectory of the latching protrusion moving in the guiding grooves for latching protrusion.

When the shifter (1115) in the state in FIG. 11(c) further slides leftward in the diagram due to the rotational driving by the gear (1118), as described above, the connecting member (1103) cannot rotationally move and maintains the position. During this process, in appearance, the latching protrusion (1107(xi)) of the connecting member (1103) moves rightward in the diagram in the guiding grooves for latching protrusion (1120(xi)) of the shifter (1115). When the latching protrusion (1107(xi)) of the connecting member (1103) reaches to the periphery of the edge of the guiding grooves for latching protrusion (1120(xi)) of the shifter (1115), the latching protrusion (1107(xi)) is lifted upper-rightward in the diagram due to a varying portion for trajectory (1120(xii)) of the guiding grooves for latching protrusion. As a result, the connecting member (1103) rotationally moves anticlockwise in the diagram. Due to the rotational movement of the connecting member, the contacting pad (1102) slides rightward in the diagram and separates from the disc.

The case of inserting the 8 cm diameter disc is described above, and the case of inserting the 12 cm diameter disc is similarly processed, and the contacting pad separates from the disc located at the predetermined relative position to the center of the turntable.

<Processes of Embodiment>

Hereinbelow, with reference to FIGS. 11, 13(A) and 13(B), processes of the case of inserting the 8 cm diameter disc and the case of inserting the 12 cm diameter disc are described.

<<8 cm Diameter Disc >>

With reference to FIG. 11, processing of the case of inserting the 8 cm diameter disc is described.

At the outset, when inserting the disc (1108), the disc (1108) is transferred in an inward direction of the device (rightward in the diagram) due to the rotation of the roller of the first driving unit for retraction (1101). Then, as shown in FIGS. 11(a) and 11(b), the disc (1108) contacts with the contacting pad (1102) at the contacting points (ii) and (iii). After that, the disc (1108) continues to move rightward in the diagram by the rotational movement of the first driving unit for retraction (1101), so that the contacting pad (1102) slides rightward in the diagram along the sliding groove of the guiding member (1106) as shown in FIG. 11(c). Moreover, upon the slide of the contacting pad (1102), the connecting member (1103), guided by the sliding groove (ix) of the guiding member (1106), rotationally moves anticlockwise in the diagram. At this time, the guiding protrusion (1105) of the connecting member (1103) moves in the short sliding groove (ix), which is located in the lower part of the diagram.

As shown in FIG. 11(c), the protrusion for ejecting shifter (1114) (0714 in FIG. 7) of the rotationally moving connecting member (1103) contacts with the portion for ejection (1116) (1216 in FIG. 12) of the shifter (1115). Due to the rotational movement anticlockwise in the diagram of the connecting member (1103), the shifter (1115) is pushed leftward in the diagram. Due to movement leftward in the diagram of the shifter (1115), the jagged portion (1219 in FIG. 12) of the shifter (1115) is engaged with the gear (1118). Subsequently, the shifter (1115) is driven by the rotation of the gear (1118), thereby sliding to the predetermined position.

Upon the slide of the shifter (1115), the latching protrusion (1107(xi)) of the connecting member (1103) is inserted into the guiding grooves for latching protrusion (1120(xi)) of the shifter (1115). As a result, the rotational movement of the latching protrusion (1120(xi)) is restricted, thereby stopping the rotational movement anticlockwise in the diagram of the connecting member (1103). Due to this, the contacting pad (1102) stops sliding rightward in the diagram, thereby stopping the movement of the disc. Here at, the disc (1108) is located at the predetermined relative position to the center of the turntable.

Subsequently, when the shifter (1115) slides leftward in the diagram due to the rotational driving by the gear (1118), the latching protrusion (1107(xi)) moving in the sliding groove for latching protrusion (1120(xi)) of the shifter (1115) in appearance is lifted upper-rightward in the diagram due to a varying portion for trajectory (1120(xii)) in the periphery of the edge of the groove. As a result, the connecting member (1103) rotationally moves anticlockwise in the diagram. Due to the rotational movement of the connecting member, the contacting pad (1102) slides rightward in the diagram. As a result, the contacting pad (1102) separates from the disc (1108).

Subsequently, the driving unit (not indicated), transferred by the shifter moved to the predetermined position, starts processing such as reading the data of the disc placed at the predetermined position.

<<12 cm Diameter Disc >>

With reference to FIGS. 13(A) and 13(B), processing of the case of inserting the 12 cm diameter disc is described.

At the outset, when inserting the disc (1308), the disc (1308) is transferred in an inward direction of the device (rightward in the diagram) due to the rotational movement of the roller of the first driving unit for retraction (1301). Then, as shown in FIG. 13(a), the disc (1308) contacts the contacting pad (1302) at the contacting point (i). After that, the disc (1308) is transferred rightward in the diagram due to the rotational driving of the first driving unit for retraction (1301), so that the contacting pad (1302) rotationally moves anticlockwise in the diagram, and as shown in FIG. 13(c), the disc (1308) contacts the contacting pad (1302) at the contacting points (i), (iii) and (iv). Moreover, due to the rotational movement of the contacting pad (1302), the connecting member (1303) slides upper-rightward in the diagram. At this time, the guiding protrusion (1305) of the connecting member (1303) sides upper-rightward in the diagram in the sliding groove (ix) of the guiding member (1306) (FIGS. 13(b) to (C)).

After that, the disc (1308) continues to move rightward in the diagram by the rotational movement of the first driving unit for retraction (1301), so that the contacting pad (1302) slides rightward in the diagram maintaining the sliding position due to the above rotational movement along the sliding groove of the guiding member (1106) as shown in FIG. 13(d). Moreover, upon the slide of the contacting pad (1302), the connecting member (1303), guided by the sliding groove (ix) of the guiding member (1306), rotationally moves anticlockwise in the diagram. At this time, the guiding protrusion (1305) of the connecting member (1303) moves in the long sliding groove (ix), which is located upper in the diagram.

As shown in FIG. 13(d), the protrusion for ejecting shifter (1314) (0714 in FIG. 7) of the rotationally moving connecting member (1303) contacts with the portion for ejection (1317) (1217 in FIG. 12) of the shifter (1315). Due to the rotational movement anticlockwise in the diagram of the connecting member (1303), the shifter (1315) is pushed leftward in the diagram. Due to movement leftward in the diagram of the shifter (1315), the jagged portion (1219 in FIG. 12) of the shifter (1315) is engaged with the gear (1318). Subsequently, the shifter (1315) is driven by the rotation of the gear (1318), thereby sliding to the predetermined position.

Upon the slide of the shifter (1315), the latching protrusion (1307(xii)) of the connecting member (1303) is inserted into the guiding grooves for latching protrusion (1320(xi)) of the shifter (1115). As a result, the rotational movement of the latching protrusion (1120(xi)) is restricted, thereby stopping the rotational movement anticlockwise in the diagram of the connecting member (1303). Due to this, the contacting pad (1302) stops sliding rightward in the diagram, thereby stopping the movement of the disc. Hereat, the disc (1308) is located at the predetermined relative position to the center of the turntable.

Subsequently, when the shifter (1315) slides leftward in the diagram due to the rotational driving by the gear (1318), the latching protrusion (1307(xi)) moving in the sliding groove for latching protrusion (1320(xi)) of the shifter (1315) in appearance is lifted upper-rightward in the diagram due to a varying portion for trajectory (1320(xiIi)) in the periphery of the edge of the groove. As a result, the connecting member (1303) rotationally moves anticlockwise in the diagram. Due to the rotational movement of the connecting member, the contacting pad (1302) slides rightward in the diagram. As a result, the contacting pad (1302) separates from the disc (1308).

Subsequently, the driving unit (not indicated), transferred by the shifter moved to the predetermined position, starts processing such as reading the data of the disc placed at the predetermined position.

Note that, when ejecting the disc (1308) from the disc drive device, reverse process of the above process is transferred out. When reaching to the state of FIG. 13(d), due to the biasing force of the biasing spring (1304), the connecting member (1303) is guided by the sliding groove, thereby sliding lower-leftward in the diagram. Due to this, the connecting pad (1302) rotates clockwise in the diagram, thereby returning to the basic position.

<Brief Description of Effects of Embodiment>

According to the disc drive device of the embodiment, it is possible to precisely place the inserted disc on the predetermined position, where the disc can be driven, in response to its size using the slot-in system without expensive components such as a sensor and with smaller number of components comparing with the conventional technology. As a result, it is possible to save space in the device, thereby minimizing the size of the device. Moreover, it is possible to reduce the number of components, thereby reducing production cost.

Figure 1A:
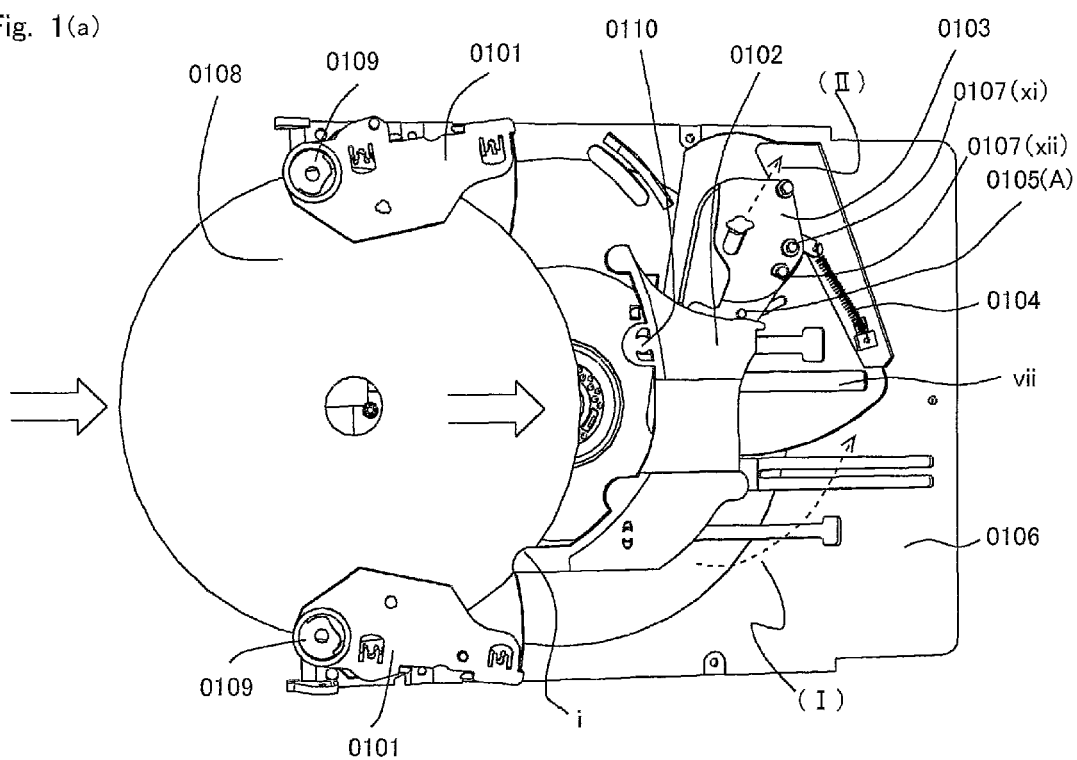
FIG. 1 is a diagram 1 showing insertion of a 12 cm diameter disc.
Figure 1B:
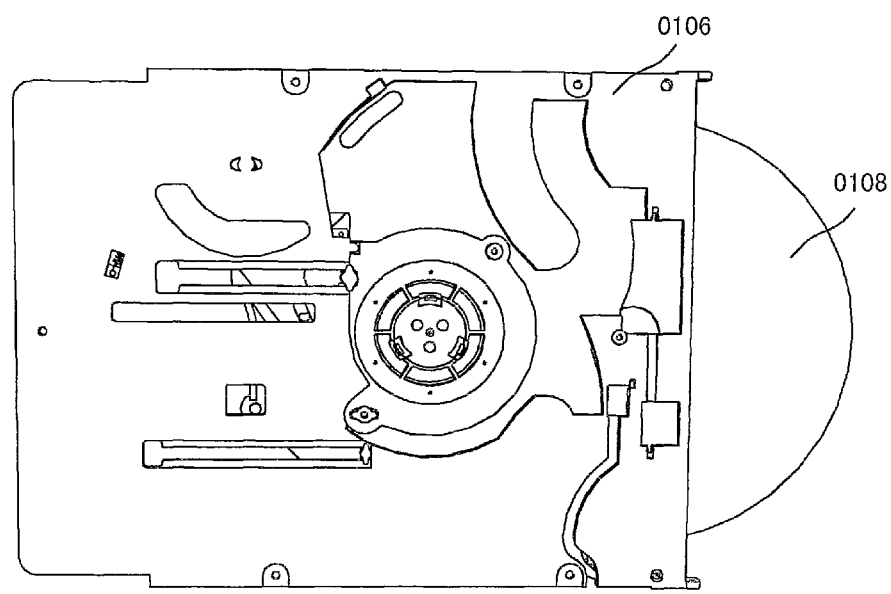
Figure 2:
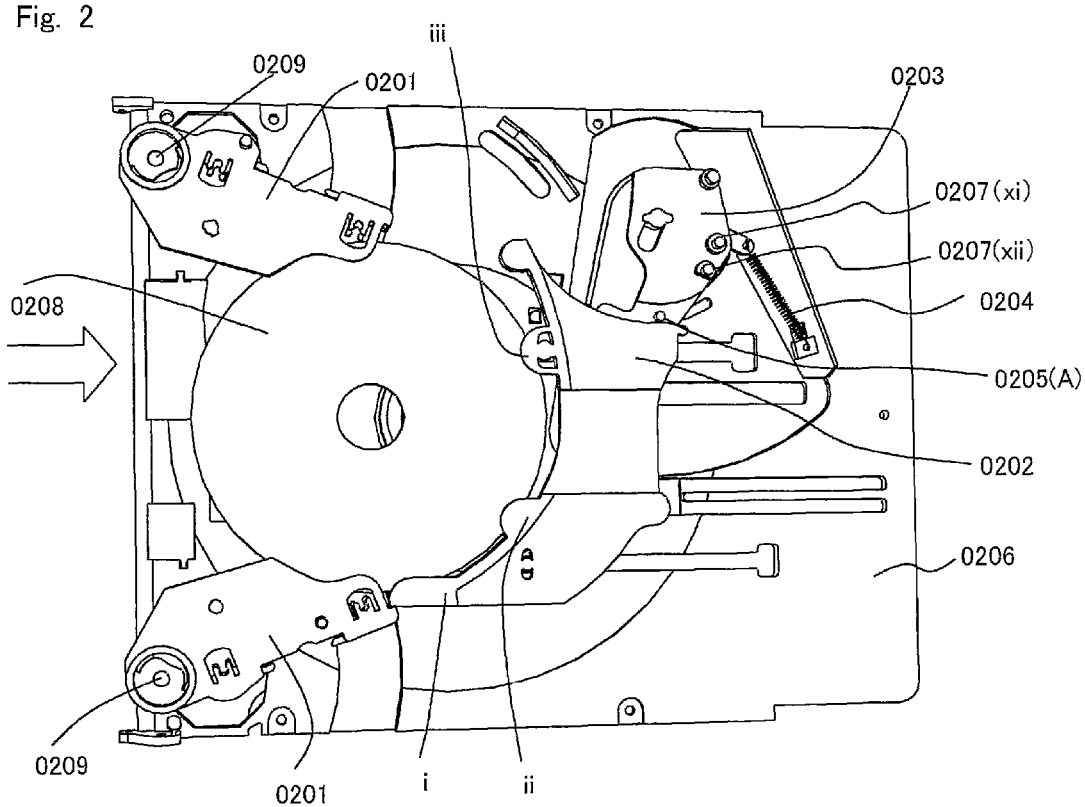
FIG. 2 is a diagram 1 showing start of insertion of an 8 cm diameter disc.
Figure 3A:
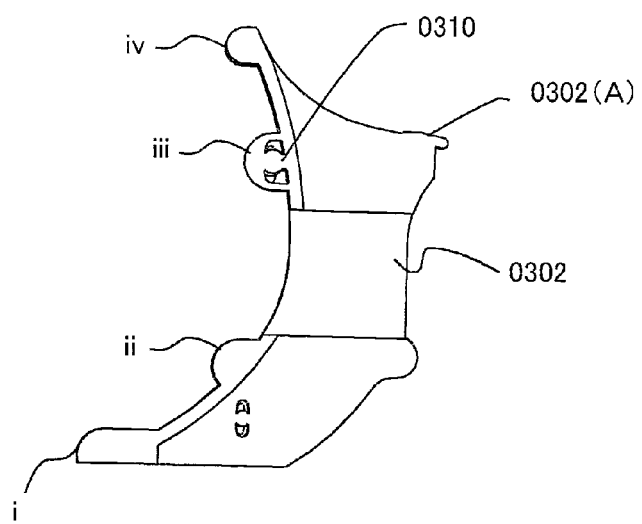
FIG. 3 shows a contacting pad.
Figure 3B:
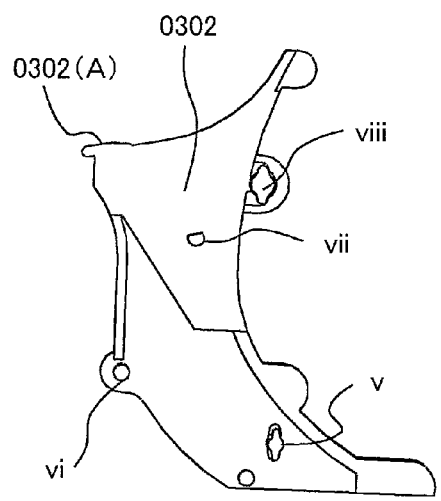
Figure 3C:
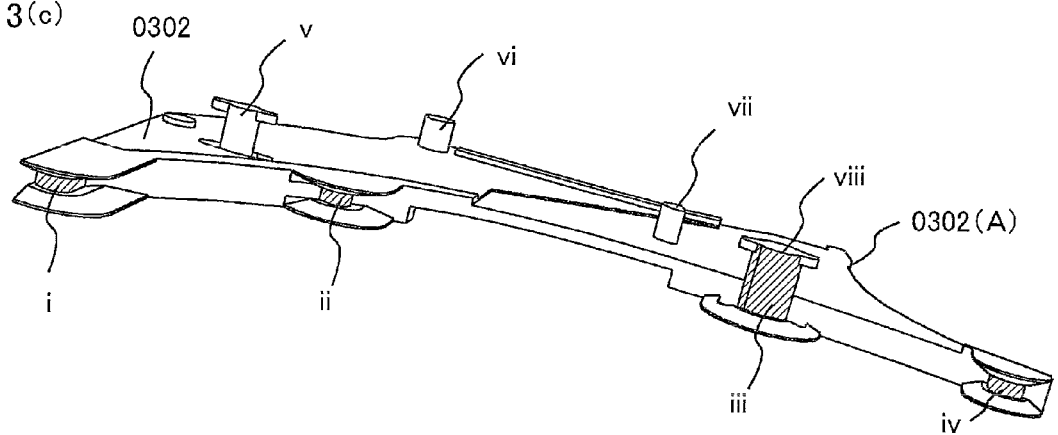
Figure 4:
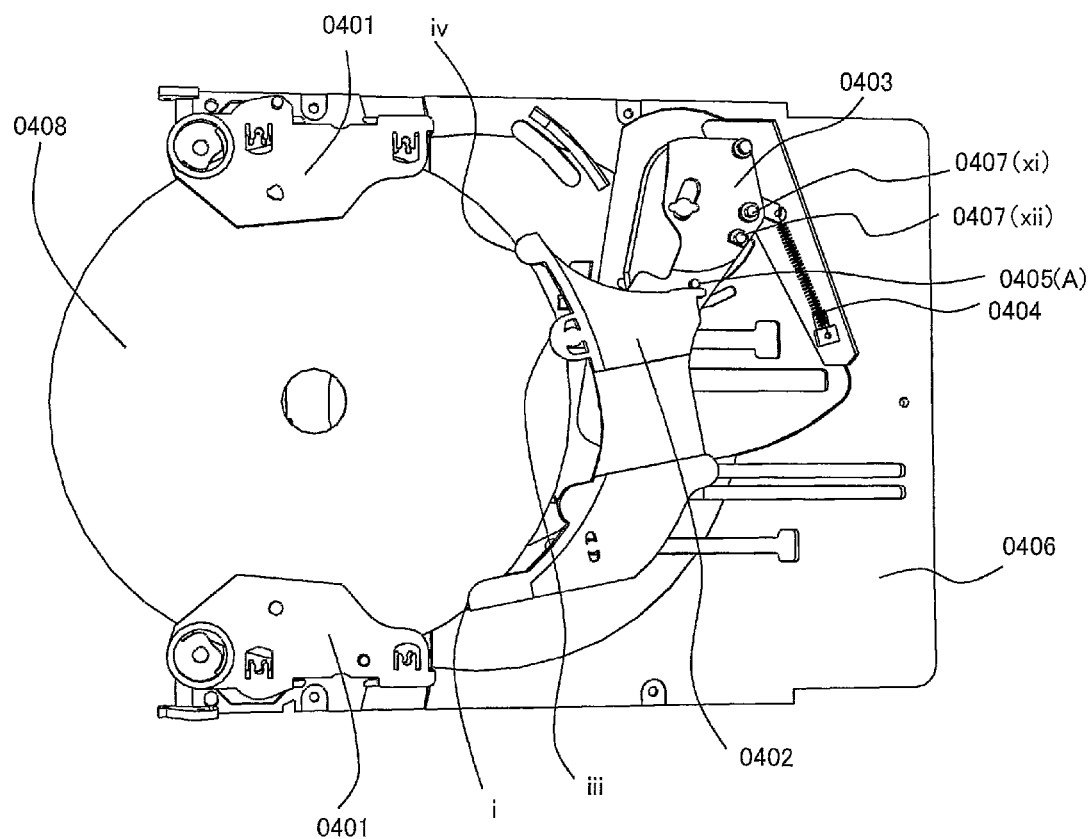
FIG. 4 is a diagram 2 showing insertion of a 12 cm diameter disc.
Figure 5A:
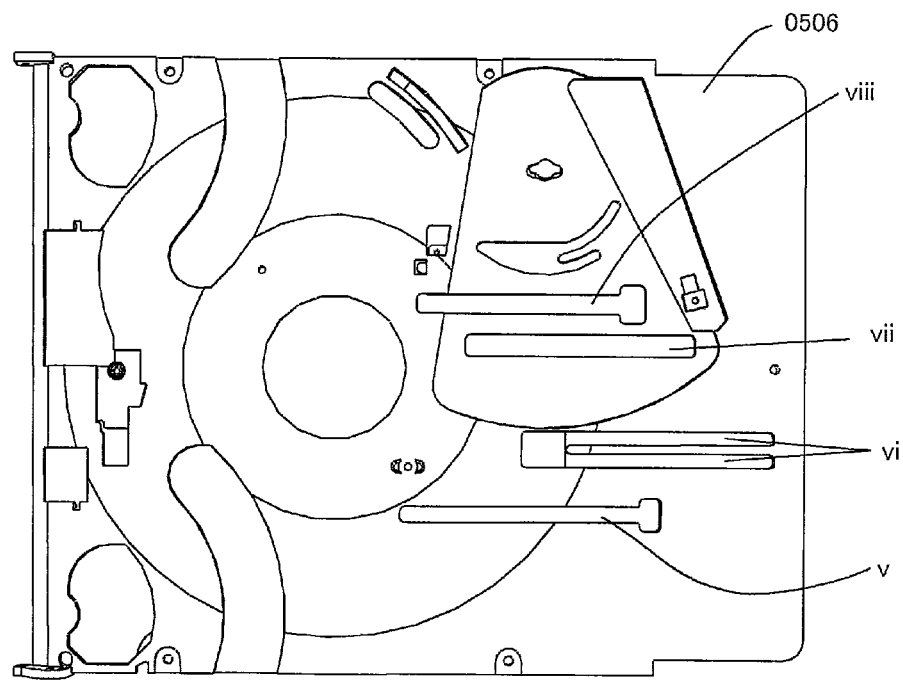
FIG. 5 shows a guiding member.
Figure 5B:
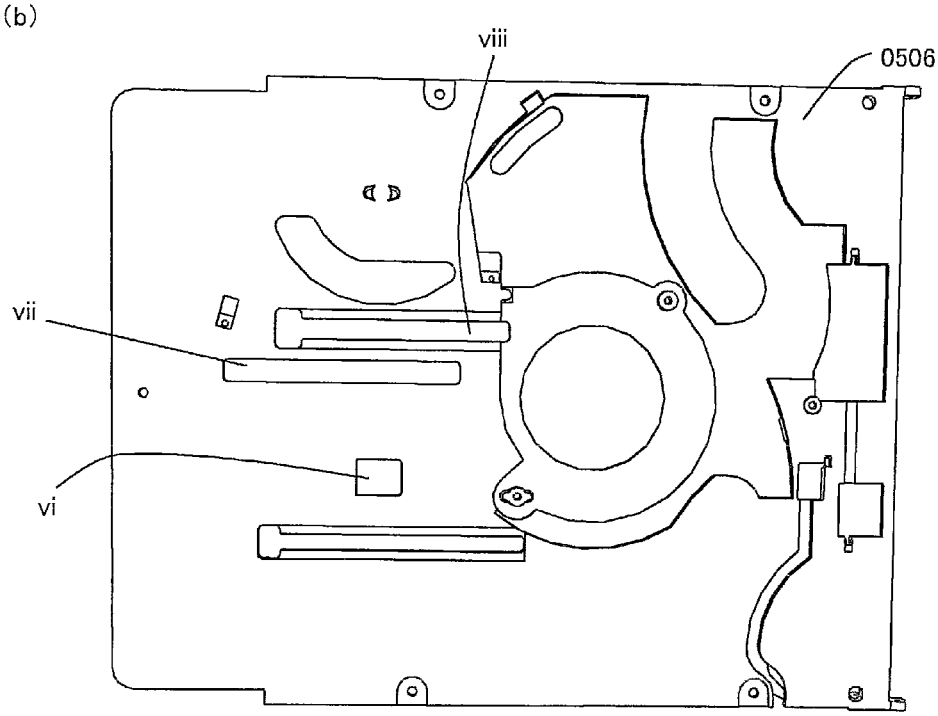
Figure 6:
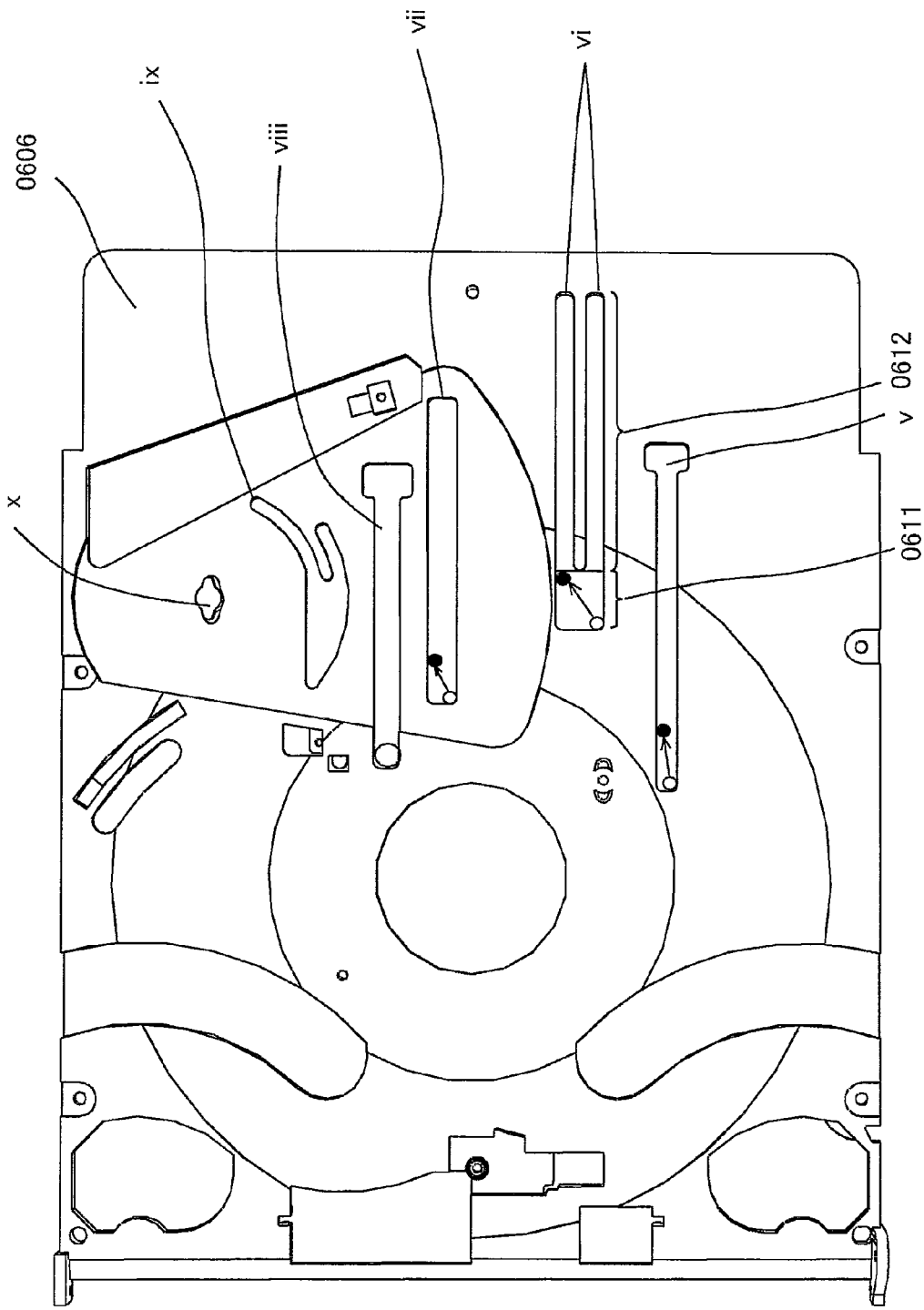
FIG. 6 is a diagram showing movement of a sliding protrusion upon rotational movement of the contacting pad.
Figure 7A:
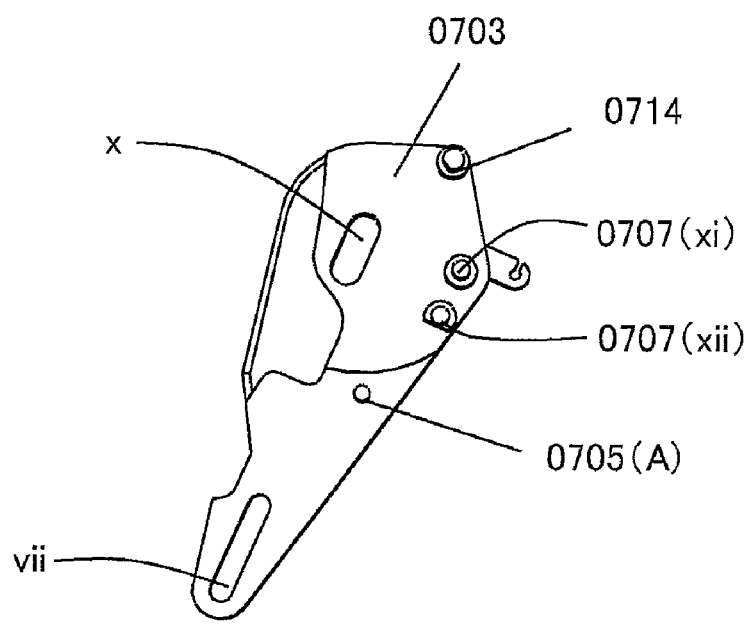
FIG. 7 shows a connecting member.
Figure 7B:
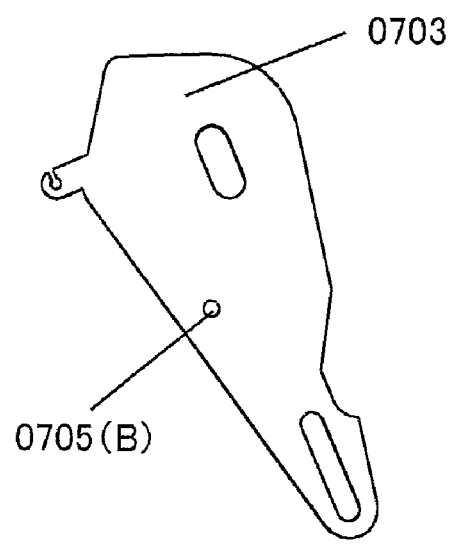
Figure 8:
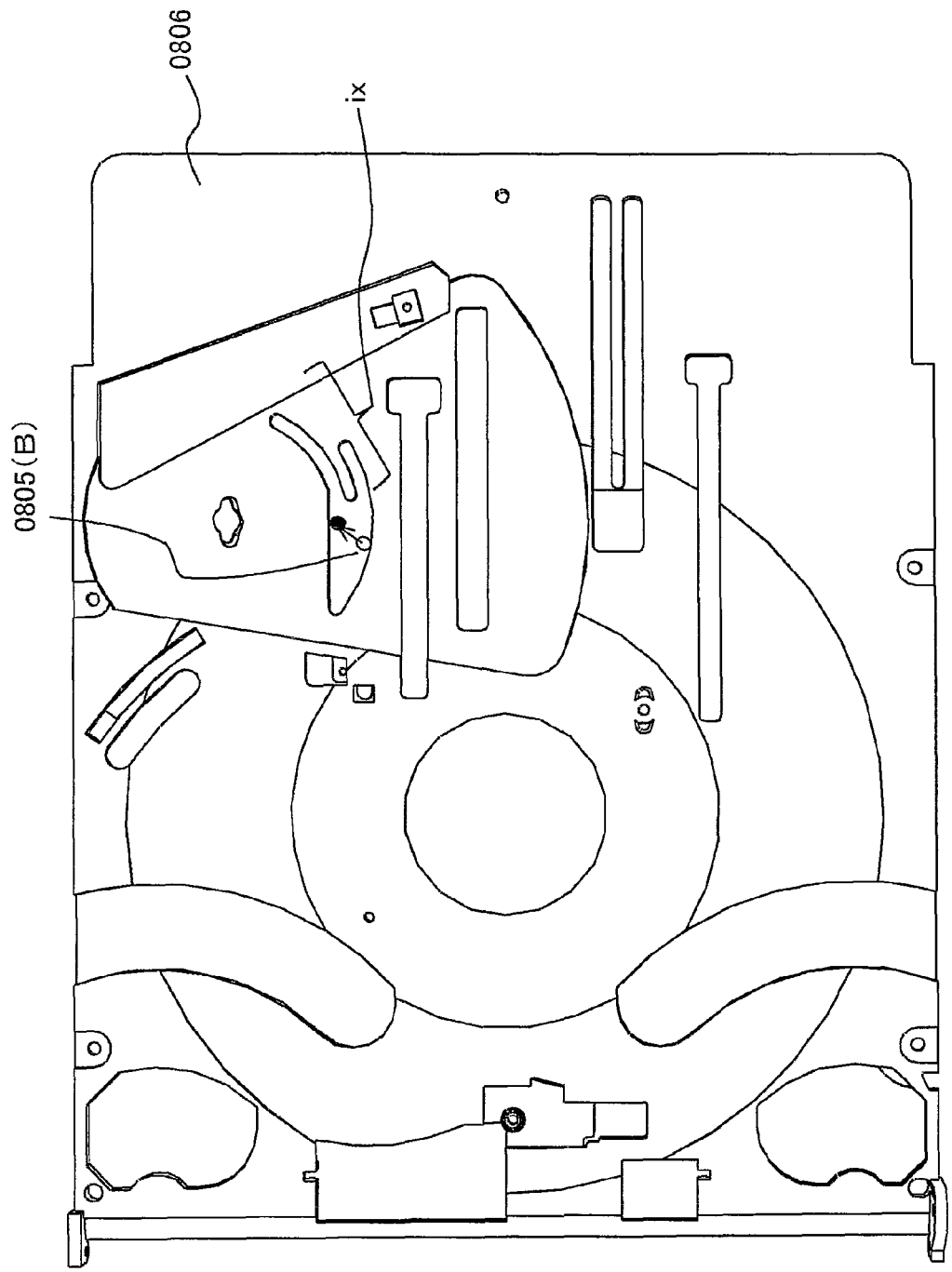
FIG. 8 is diagram showing movement of a guiding protrusion upon slide of the connecting member.
Figure 9:
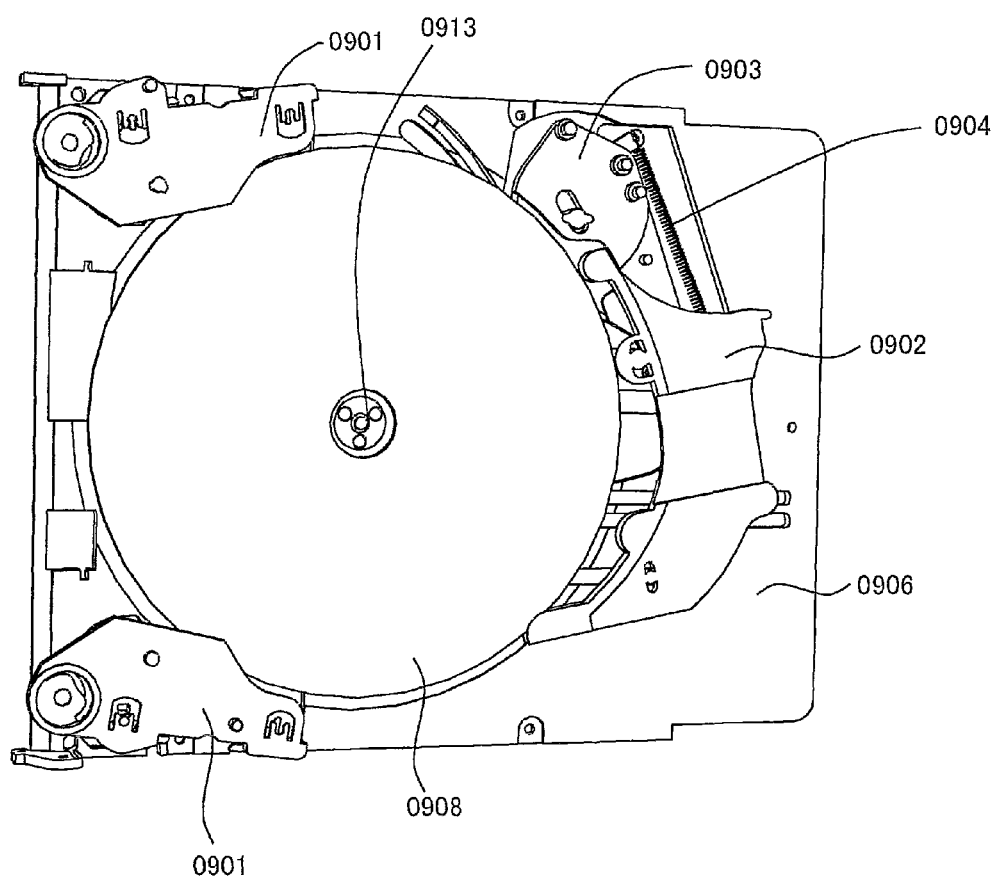
FIG. 9 is a diagram showing a state that the 12 cm diameter disc is placed at a predetermined position.
Figure 10:
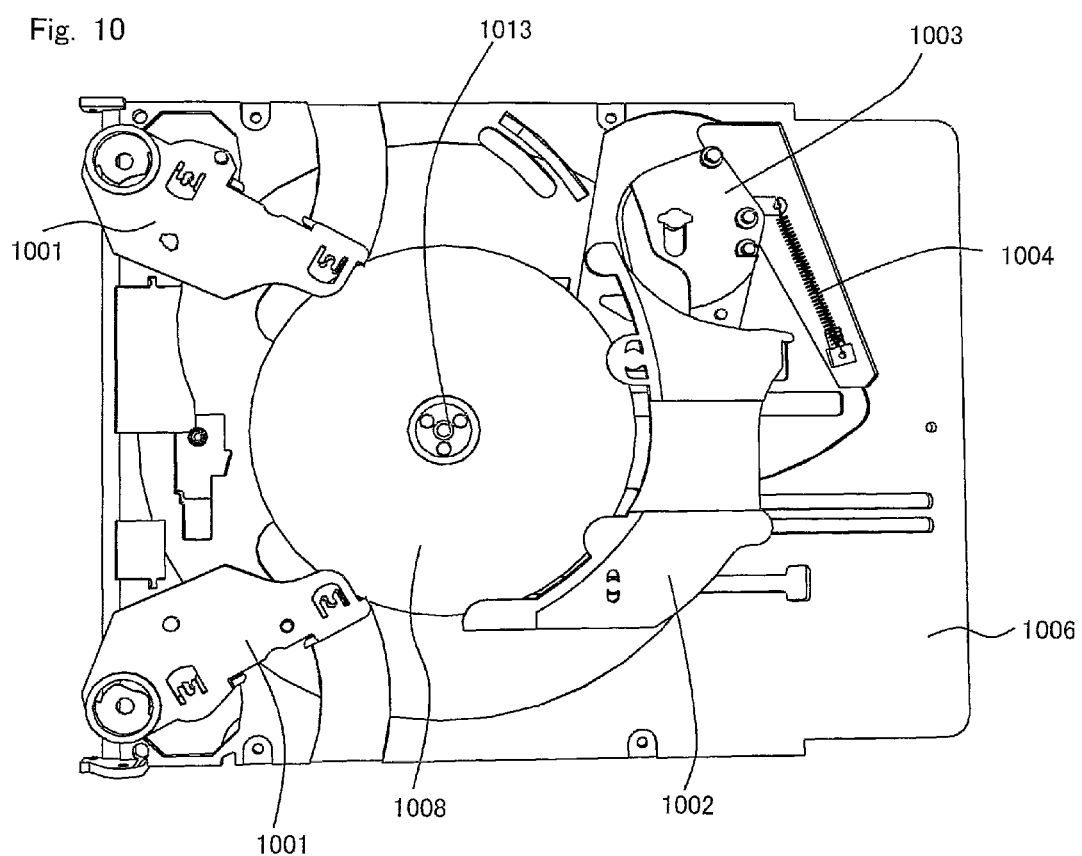
FIG. 10 is a diagram showing a state that the 8 cm diameter disc is placed at a predetermined position.
Figure 11:
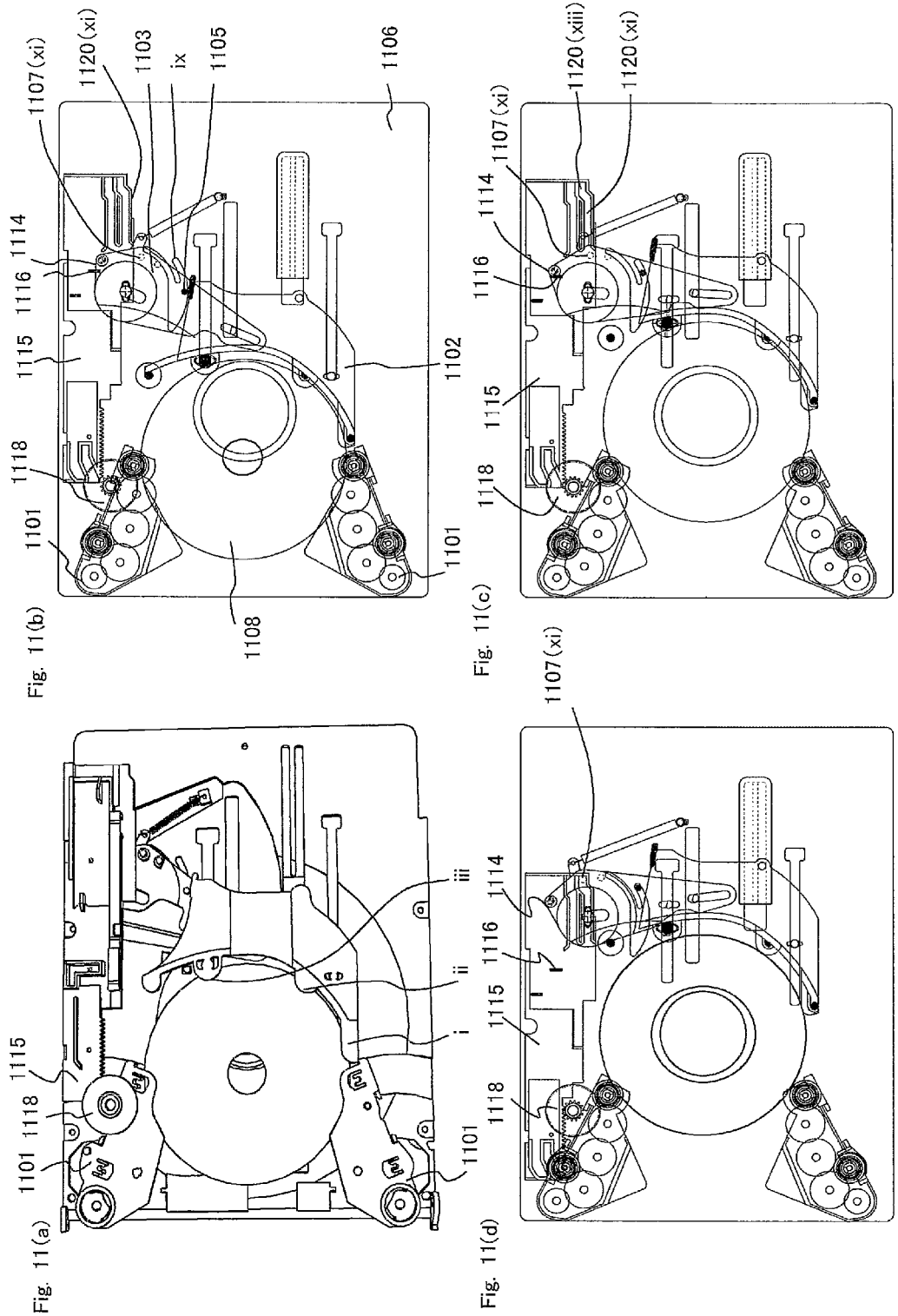
FIG. 11 is a diagram showing placement of the 8 cm diameter disc at the predetermined position.
Figure 12:
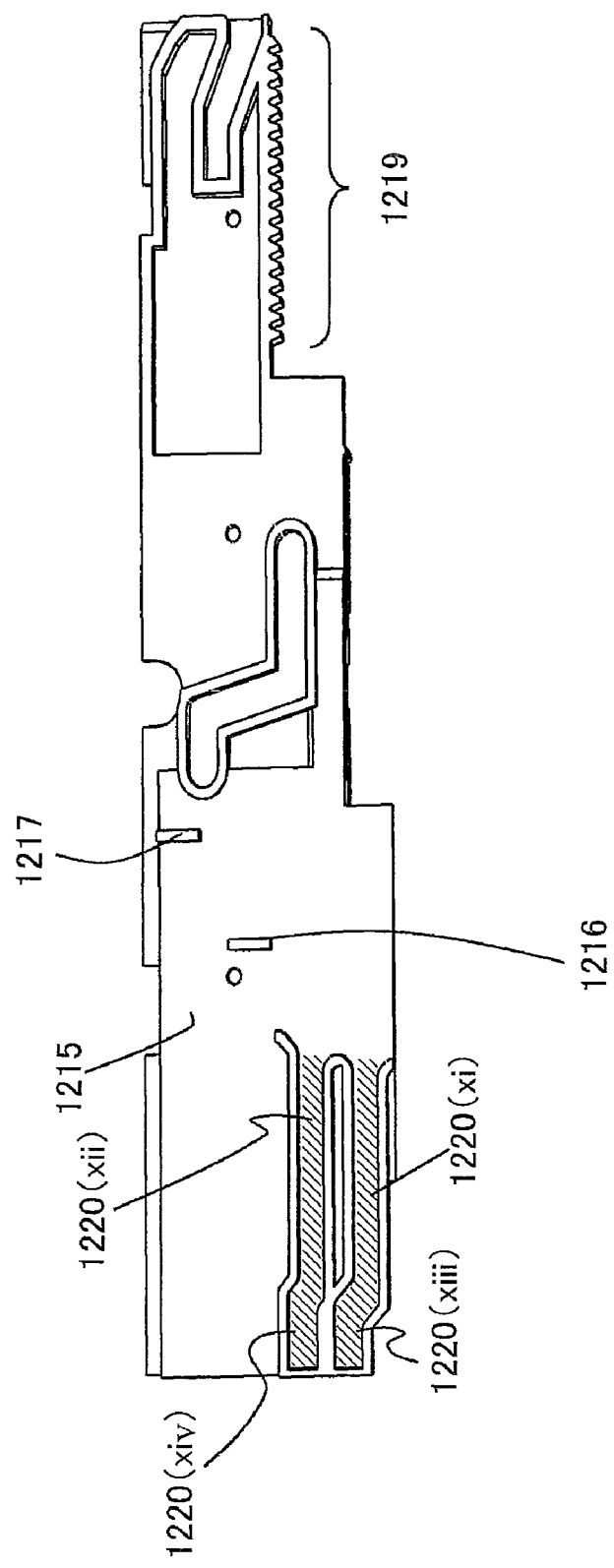
FIG. 12 shows a shifter.
Figure 13:
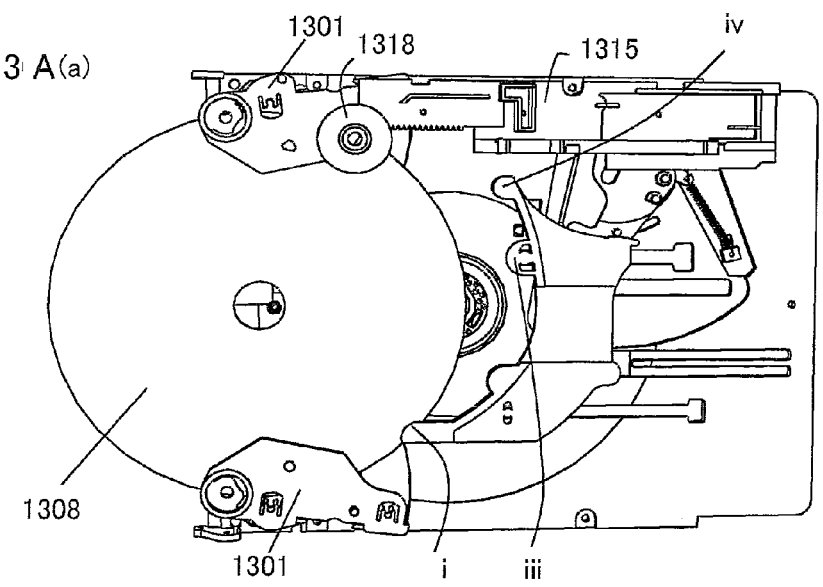
FIG. 13A is a diagram 1 showing placement of the 12 cm diameter disc at the predetermined position.
FIG. 13B is a diagram 2 showing placement of the 12 cm diameter disc at the predetermined position.
Figure 13:
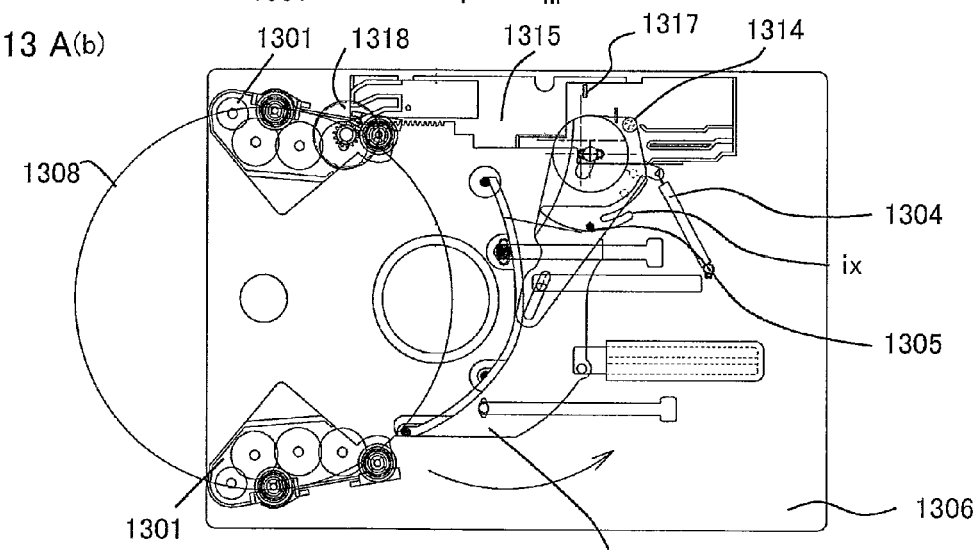
Figure 13:
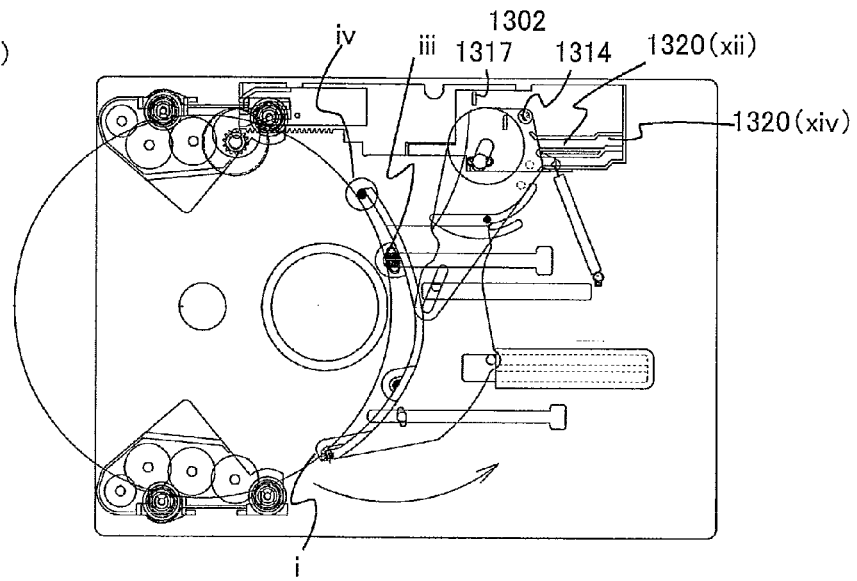
Figure 13:
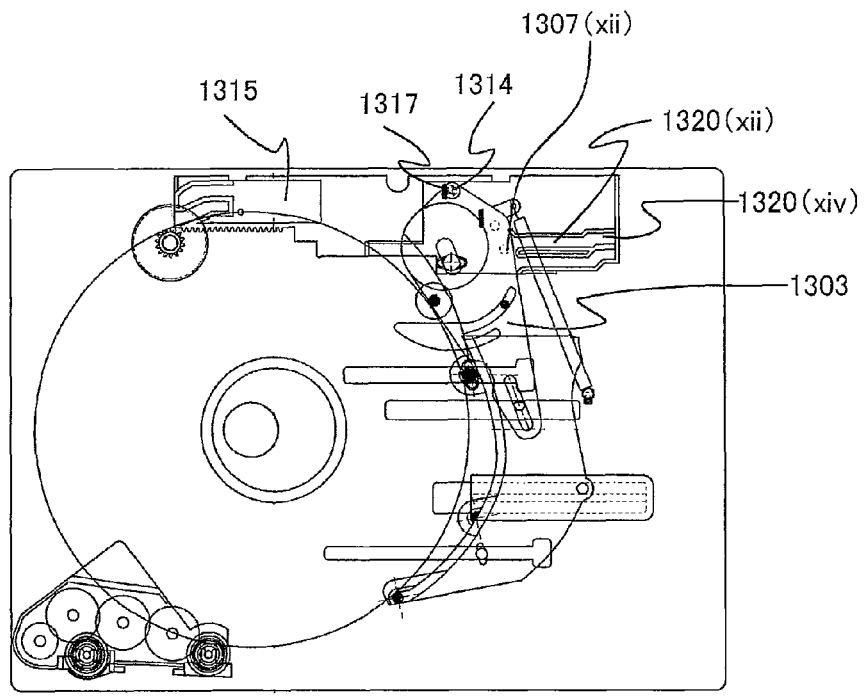
Figure 13:
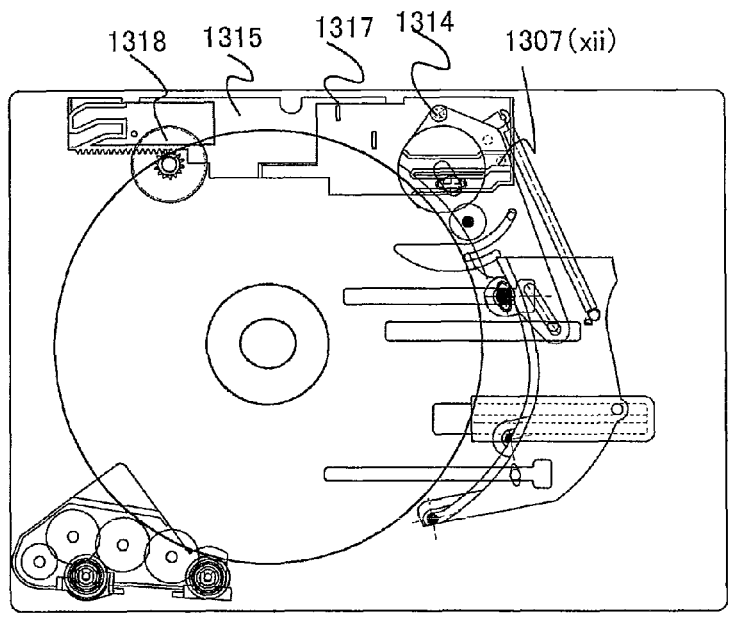
Figure 14:
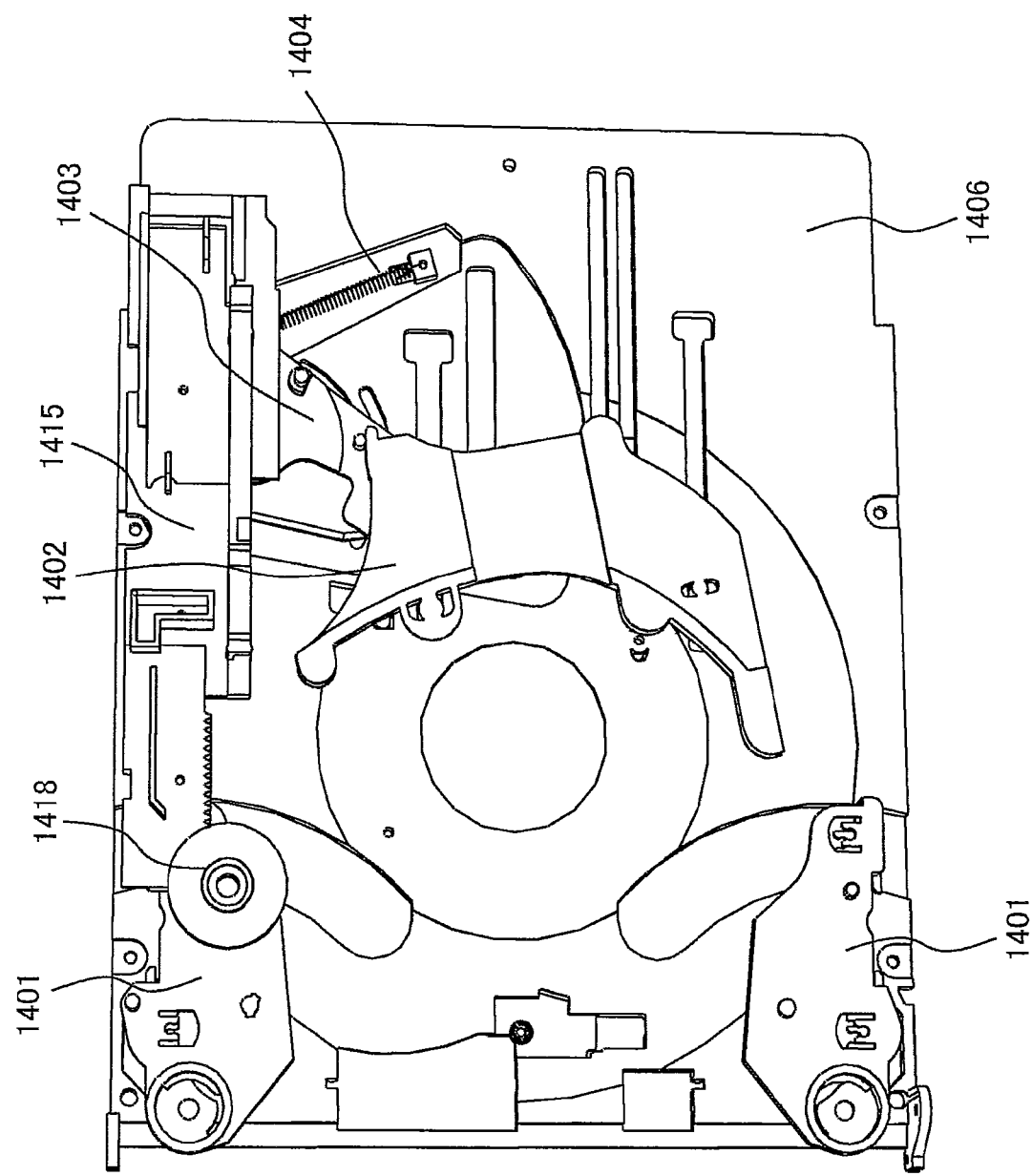
FIG. 14 is a diagram showing a disc drive device of an embodiment.

<Description of the Reference Numerals>
1401 First driving unit for retraction
1402 Contacting pad
1403 Connecting member
1404 Biasing spring
1406 Guiding member
1415 Shifter
1418 Gear

What is claimed is:

1. A disc drive device capable of distinguishing discs of different diameters, and of loading the discs on respective proper positions using a slot-in system, comprising:
   a first driving unit for retraction, retracting the disc of each diameter in an inward direction of the device;
   a contacting pad, contacting with an edge of the disc retracted by the driving unit for retraction at different points depending on the disc diameter, and sliding in response to the retraction of the disc in a sliding position depending on a contacting point;
   a shifter, sliding in a direction of retracting the disc; and
   a connecting member, sliding in response to variation of the sliding position of the contacting pad, and rotationally moving in response to the sliding of the contacting pad,
   wherein the connecting member comprises a latching protrusion, rotationally moving in different trajectory in response to the sliding position of the contacting pad, the shifter comprises a guiding groove for latching protrusion, into which the latching protrusion is inserted, and when the latching protrusion is inserted into the guiding groove for latching protrusion, the rotational movement of the connecting member in response to the sliding of the contacting pad stops, and the disc is placed such that the disc of respective diameters is located at a predetermined relative position to a center of a turntable.

2. The disc drive device according to claim 1,
   wherein the connecting member also rotationally moves in response to the sliding of the shifter in the direction of retracting the disc, and
   the contacting pad also slides in response to the rotational movement of the connecting member in response to the sliding of the shifter in the direction of retracting the disc, thereby being non-contact with the disc.

3. The disc drive device according to claim 1, further comprising:
   a biasing spring, biasing the sliding connecting member to return to an initial position.

4. The disk drive device according to claim 1, comprising:
   a guiding member, including a plurality of sliding grooves to slide the contacting pad in response to the retraction of the disc, wherein the contacting pad further comprises a plurality of sliding protrusions inserted into the sliding grooves, and timings of starting movements between the plurality of sliding protrusions are determined in response to the contacting points of the contacting pad with the disc, and the sliding position of the sliding contacting pad is determined in response to the timings of starting movements between the plurality of sliding protrusions.

5. The disk drive device according to claim 1, wherein the connecting member comprises a protrusion for ejecting shifter, rotationally moving in different trajectory in response to the sliding position of the contacting pad, and the shifter comprises two portions for ejection, respectively contacting with the protrusion for ejecting shifter, rotationally moving in different trajectory.

6. The disc drive device according to claim 2, further comprising:
a biasing spring, biasing the sliding connecting member to return to an initial position.

7. The disk drive device according to claim 2, comprising:
a guiding member, including a plurality of sliding grooves to slide the contacting pad in response to the retraction of the disc, wherein the contacting pad further comprises a plurality of sliding protrusions inserted into the sliding grooves, and timings of starting movements between the plurality of sliding protrusions are determined in response to the contacting points of the contacting pad with the disc, and the sliding position of the sliding contacting pad is determined in response to the timings of starting movements between the plurality of sliding protrusions.

8. The disk drive device according to claim 3, comprising:
a guiding member, including a plurality of sliding grooves to slide the contacting pad in response to the retraction of the disc, wherein the contacting pad further comprises a plurality of sliding protrusions inserted into the sliding grooves, and timings of starting movements between the plurality of sliding protrusions are determined in response to the contacting points of the contacting pad with the disc, and the sliding position of the sliding contacting pad is determined in response to the timings of starting movements between the plurality of sliding protrusions.

9. The disk drive device according to claim 2, wherein the connecting member comprises a protrusion for ejecting shifter, rotationally moving in different trajectory in response to the sliding position of the contacting pad, and the shifter comprises two portions for ejection, respectively contacting with the protrusion for ejecting shifter, rotationally moving in different trajectory.

10. The disk drive device according to claim 3, wherein the connecting member comprises a protrusion for ejecting shifter, rotationally moving in different trajectory in response to the sliding position of the contacting pad, and the shifter comprises two portions for ejection, respectively contacting with the protrusion for ejecting shifter, rotationally moving in different trajectory.

11. The disk drive device according to claim 4, wherein the connecting member comprises a protrusion for ejecting shifter, rotationally moving in different trajectory in response to the sliding position of the contacting pad, and the shifter comprises two portions for ejection, respectively contacting with the protrusion for ejecting shifter, rotationally moving in different trajectory.

* * * * *